(12) United States Patent
Wakabayashi et al.

(10) Patent No.: US 12,439,005 B2
(45) Date of Patent: Oct. 7, 2025

(54) DISPLAY DEVICE, FISH COUNTING SYSTEM PROVIDED THEREWITH, AND DISPLAY CONTROL PROGRAM

(71) Applicant: Yanmar Holdings Co., Ltd., Osaka (JP)

(72) Inventors: Isao Wakabayashi, Osaka (JP); Yuichiro Dake, Osaka (JP); Yasuhiro Ueda, Osaka (JP); Toshiaki Sakai, Itami (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 136 days.

(21) Appl. No.: 18/037,746

(22) PCT Filed: Oct. 27, 2021

(86) PCT No.: PCT/JP2021/039622
§ 371 (c)(1),
(2) Date: May 18, 2023

(87) PCT Pub. No.: WO2022/107561
PCT Pub. Date: May 27, 2022

(65) Prior Publication Data
US 2024/0015268 A1    Jan. 11, 2024

(30) Foreign Application Priority Data
Nov. 20, 2020  (JP) .................................. 2020-193075

(51) Int. Cl.
*H04N 7/18* (2006.01)
*A01K 61/95* (2017.01)
(Continued)

(52) U.S. Cl.
CPC ............. *H04N 7/183* (2013.01); *A01K 61/95* (2017.01); *G06F 3/0482* (2013.01); *G06V 20/05* (2022.01);
(Continued)

(58) Field of Classification Search
None
See application file for complete search history.

(56) References Cited

U.S. PATENT DOCUMENTS

2018/0263223 A1*  9/2018  Kodaira ................. A01K 61/95

FOREIGN PATENT DOCUMENTS

JP    2005-202674 A    7/2005
JP    2010-157076 A    7/2010
(Continued)

OTHER PUBLICATIONS

International Search Report dated Jan. 18, 2022 issued in corresponding PCT Application PCT/JP2021/039622.
(Continued)

*Primary Examiner* — Samira Monshi
(74) *Attorney, Agent, or Firm* — NORTON ROSE FULBRIGHT US LLP

(57) ABSTRACT

A display device is used for a number-of-fish counting system for counting the number of fish. The display device is provided with a display unit that displays a plurality of selectable instruction items on a main screen. The plurality of instruction items include a recording instruction item that instructs a processing device of the number-of-fish counting system to execute or stop recording of video of fish, and an analysis instruction item that instructs the processing device to count the number of the fish by analyzing the fish on the basis of the recorded video.

13 Claims, 11 Drawing Sheets

(51) Int. Cl.
  *G06F 3/0482*  (2013.01)
  *G06V 20/05*  (2022.01)
  *G06V 20/40*  (2022.01)
  *G06V 40/10*  (2022.01)
  *H04N 23/62*  (2023.01)
  *H04N 23/66*  (2023.01)

(52) U.S. Cl.
  CPC .............. *G06V 20/40* (2022.01); *G06V 40/10* (2022.01); *H04N 23/62* (2023.01); *H04N 23/66* (2023.01)

(56) References Cited

FOREIGN PATENT DOCUMENTS

| | | |
|---|---|---|
| JP | 2016-165238 A | 9/2016 |
| JP | 2019-009623 A | 1/2019 |
| JP | 2019-204434 A | 11/2019 |
| JP | 2019-207552 A | 12/2019 |
| JP | 2020-155089 A | 9/2020 |
| WO | 2020/179869 A1 | 9/2020 |

OTHER PUBLICATIONS

Japanese Office Action dated Dec. 12, 2023 issued for JP Application No. 2020193075.

* cited by examiner

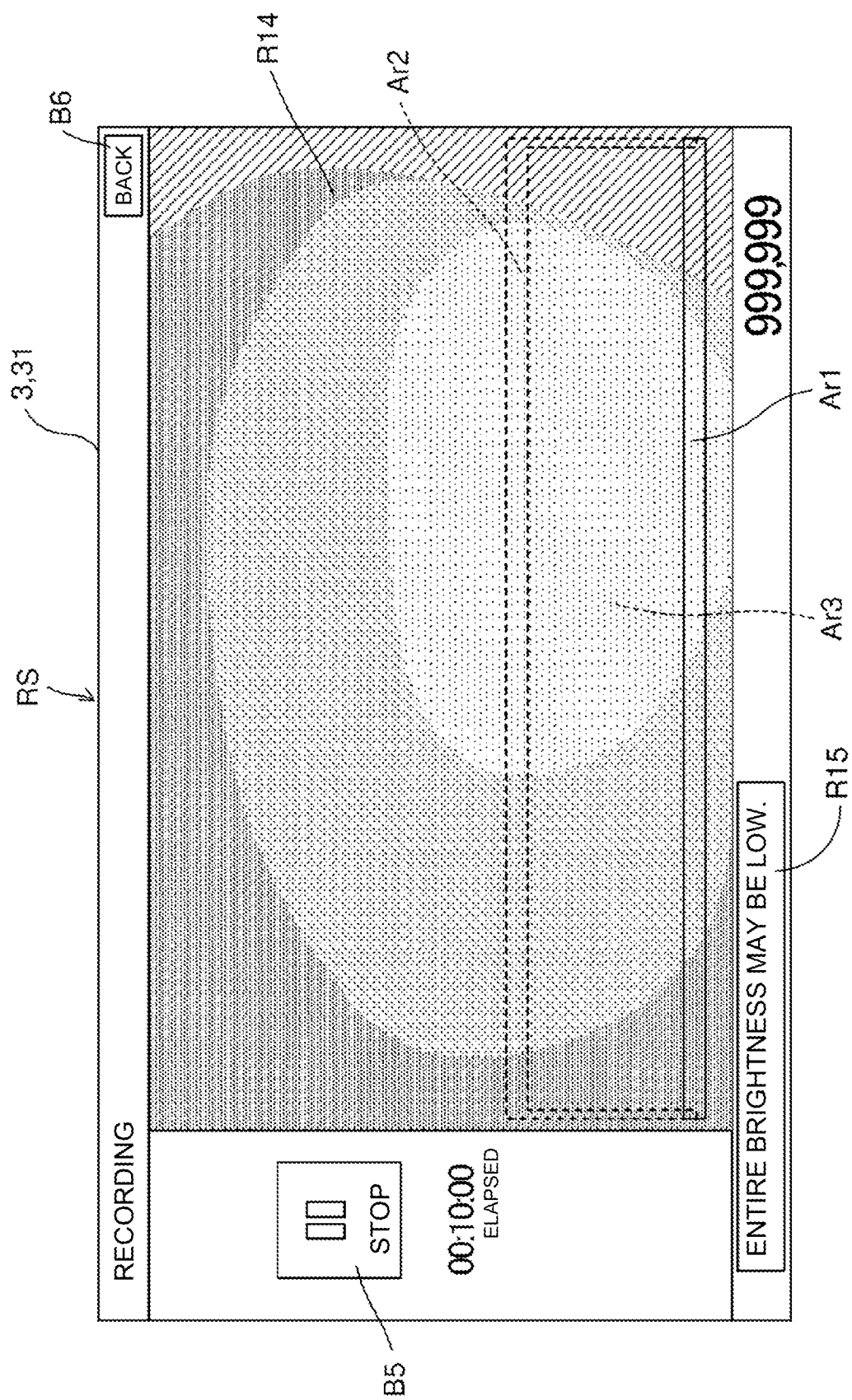

FIG. 7

FILE MANAGEMENT                                                    FS → 3,31    B12 BACK

| Date/Time | Status | Details |
|---|---|---|
| 08:01:12 JULY 26, 2019 00:00:02 999,999 | ANALYZED | |
| 09:01:12 JULY 26, 2019 00:00:02 999,999 | ANALYZED | |
| 10:01:12 JULY 26, 2019 00:00:02 999,999 | ANALYZED | |
| 11:01:12 JULY 26, 2019 00:00:02 999,999 | ANALYZED | |
| 12:01:12 JULY 26, 2019 00:00:02 999,999 | ANALYZED | IMAGING DATE AND TIME: 12:01:12, JULY 26, 2019<br>IMAGING TIME: 00:00:02<br>LAST UPDATE: 12:12:12, DECEMBER 12, 2019<br>FISH SPECIES: TUNA (30~80kg)<br>FISH COUNT: 999,999<br>SOFTWARE VERSION: 123.123.123<br>ANALYSIS VERSION: ABABENTBQ_AWRVQM_123 |
| 13:01:12 JULY 26, 2019 00:00:02 999,999 | ANALYZED | |
| 14:01:12 JULY 26, 2019 00:00:02 999,999 | ANALYZED | |
| 15:01:12 JULY 26, 2019 00:00:02 999,999 | ANALYZED | |
| 16:01:12 JULY 26, 2019 00:00:02 999,999 | ANALYZED | |
| 17:01:12 JULY 26, 2019 00:00:02 999,999 | ANALYZED | |
| 18:01:12 JULY 26, 2019 00:00:02 999,999 | ANALYZED | |
| 19:01:12 JULY 26, 2019 00:00:02 999,999 | ANALYZED | |
| 20:01:12 JULY 26, 2019 00:00:02 999,999 | ANALYZED | |
| 21:01:12 JULY 26, 2019 00:00:02 999,999 | ANALYZED | |

B7 ANALYSIS
B8 DISPLAY
B9 DELETE
B10 EXPORT

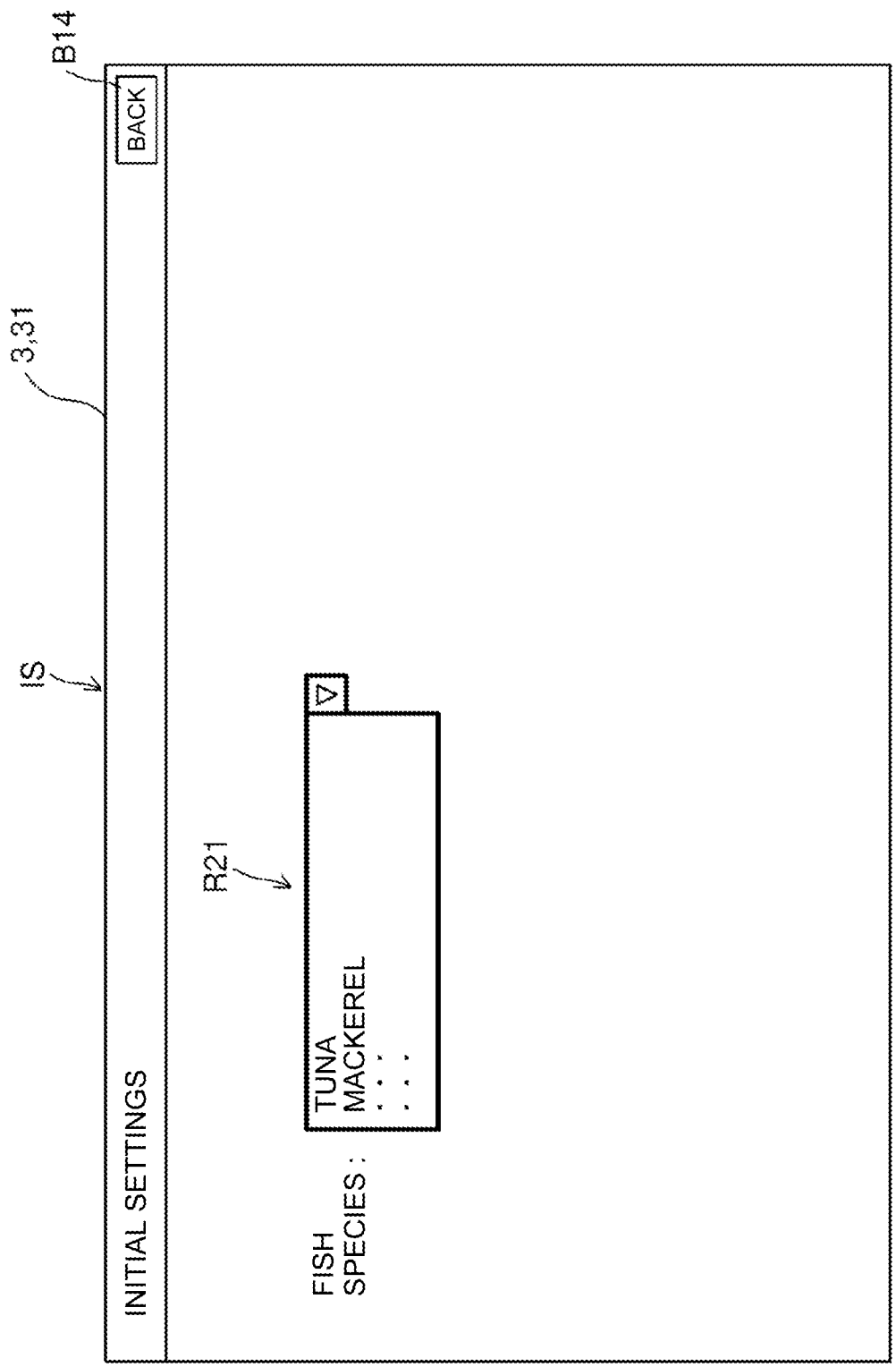

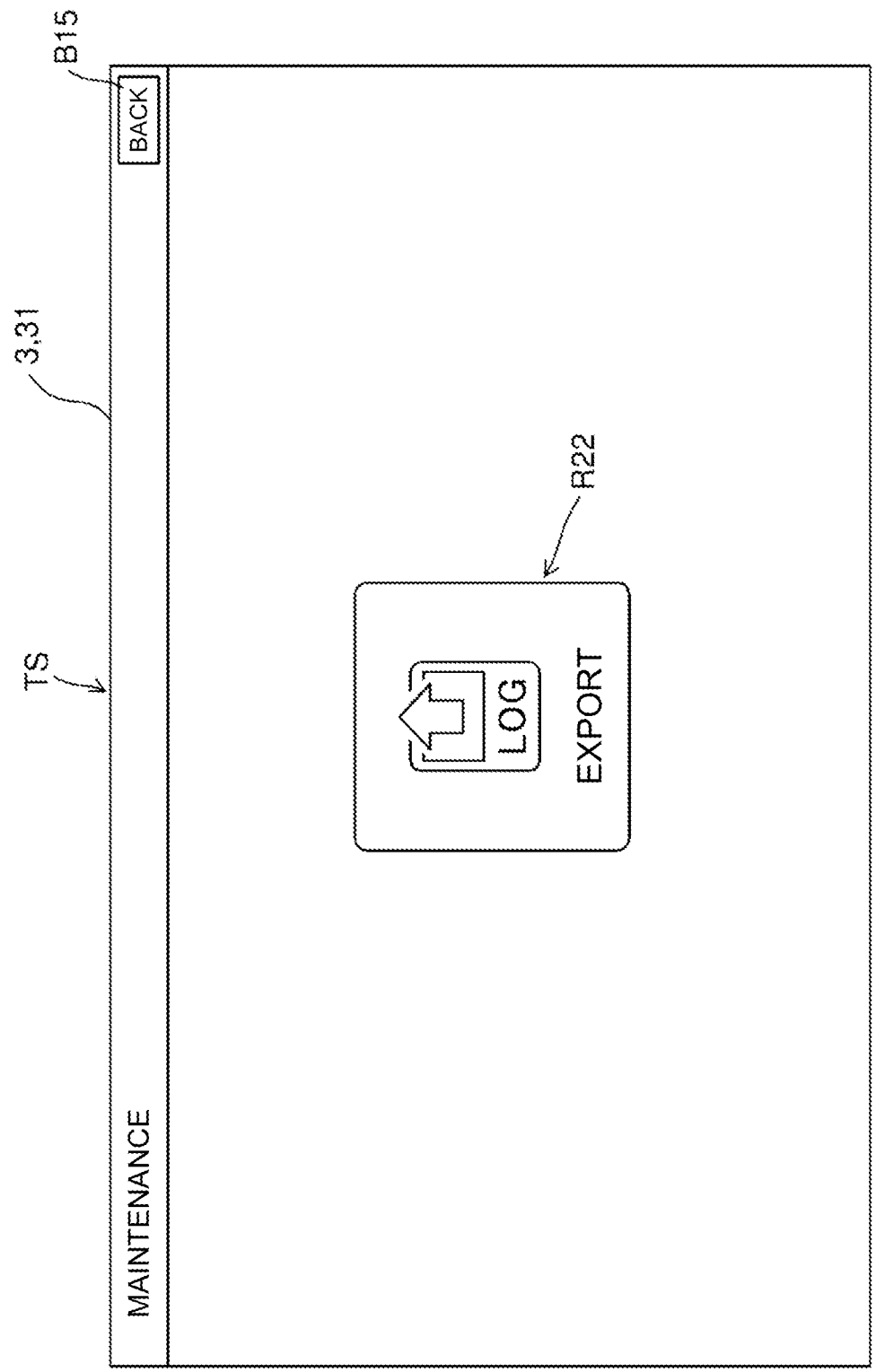

DISPLAY DEVICE, FISH COUNTING SYSTEM PROVIDED THEREWITH, AND DISPLAY CONTROL PROGRAM

CROSS-REFERENCE TO RELATED APPLICATIONS

This application is a national stage application pursuant to 35 U.S.C. § 371 of International Application No. PCT/JP2021/039622, filed on Oct. 27, 2021, which claims priority under 35 U.S.C. § 119 to Japanese Patent Application No. 2020-193075 filed on Nov. 20, 2020, the disclosures of which are hereby incorporated by reference in their entireties.

TECHNICAL FIELD

The present invention relates to a display device used for a fish counting system, the fish counting system, and a display control program.

BACKGROUND ART

It is desirable to accurately determine the number of fish in cultivation of tuna and other fish to reduce feed costs and to realize planed production. For example, Patent Literature 1 discloses a technique for counting the number of fish passing by using a plurality of cameras and displaying a result of the counting on a screen.

CITATION LIST

Patent Literature

Patent Literature 1: Japanese Unexamined Patent Application Publication No. 2005-202674

DISCLOSURE OF INVENTION

Problems to be Solved by the Invention

However, in Patent Literature 1, there is no consideration of a display screen of a display unit that allows a user to intuitively recognize that it is possible to instruct a fish counting processor to execute or stop recording of a video and to count the number of fish by analysis of fish based on the recorded video.

The present invention is made to solve the above problem, and an object of the present invention is to provide a display device that enables a user to intuitively recognize that it is possible to instruct a processing device to execute or stop recording of a video and to instruct counting of the number of fish by analysis of fish based on the recorded video, a fish counting system including the display device, and a display control program.

Means for Solving the Problems

According to an aspect of the present invention, a display device used in a fish counting system that counts the number of fish includes a display unit that displays a plurality of selectable instruction items on a main screen. The plurality of instruction items include a recording instruction item for instructing a processing device of the fish counting system to perform or stop recording of a video of fish, and an analysis instruction item for instructing the processing device to count the number of fish by fish analysis based on the recorded video.

According to another aspect of the present invention, a fish counting system includes the display device described above, an input unit for selecting an item to be displayed on the display unit of the display device, and a processing device that counts the number of fish in accordance with the selection of the item by the input unit.

According to a further aspect of the present invention, a display control program that causes a computer to execute a step of displaying, on a main screen of a display unit of a display device, a recording instruction item for instructing a processing device of a fish counting system to perform or stop recording of a video of fish, and a step of displaying, on the main screen of the display unit of the display device, an analysis instruction item for instructing the processing device to count the number of fish by analyzing the fish based on the recorded video.

Effect of the Invention

According to the above configuration, the user can intuitively recognize that it is possible to instruct the processing device to execute or stop recording of a video and to count the number of fish by analyzing the fish based on the recorded video.

BRIEF DESCRIPTION OF DRAWINGS

FIG. 6 is a diagram schematically illustrating an example of an operation screen displayed by the display unit.

FIG. 7 is a diagram schematically illustrating an example of a file management screen displayed by the display unit.

FIG. 10 is a diagram schematically illustrating an example of an initial setting screen displayed by the display unit.

FIG. 11 is a diagram schematically illustrating an example of a maintenance screen displayed by the display unit.

DESCRIPTION OF EMBODIMENTS

An exemplary embodiment of the present invention will be described hereinafter with reference to the accompanying drawings.

1. Configuration of Fish Counting System

Figure 1:
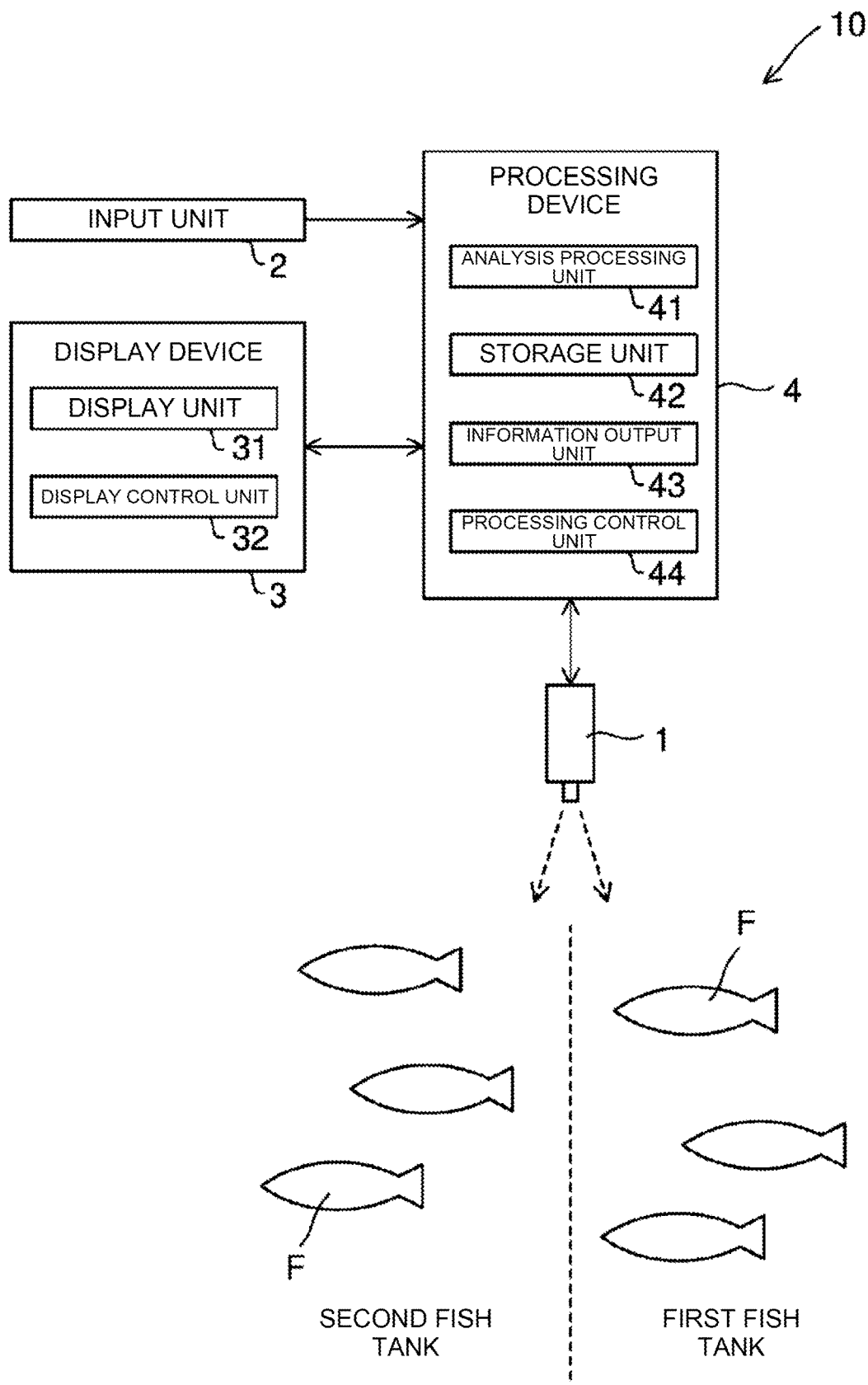
FIG. 1 is a diagram schematically illustrating a configuration of a fish counting system according to an embodiment of the present disclosure.

FIG. 1 is a diagram schematically illustrating a configuration of a fish counting system 10 according to this embodiment. The fish counting system 10 includes an imaging unit 1, an input unit 2, a display device 3, and a processing device 4.

1-1. Imaging Unit

The imaging unit 1 is constituted by a camera (video camera) capable of capturing a moving image at 30 fps (Flames Per Second). The imaging unit 1 captures images of flow paths of fish F, for example, in rivers, oceans, or aquaculture farms. For example, as shown in FIG. 1, when first and second fish tanks are directly connected to each other and fish F, such as tuna, are moved from the first fish tank to the second fish tank, an image of a flow path of the fish F is captured by the imaging unit 1 installed near an entrance of the second fish tank. Data of a video captured by the imaging unit 1 is transmitted to the processing device 4. Note that an installation position of the imaging unit 1 is not limited to near the entrance of the second fish tank. For example, the imaging unit 1 may be installed near an exit of the first fish tank.

1-2. Input Unit

The input unit 2 is constituted by an input device, such as a mouse, a keyboard, a touchpad, or a touch panel, and is used by a user (e.g., a fish farmer) to issue various instructions to the processing device 4. In particular, when the input unit 2 is constituted by a touch panel, the input unit 2 is superposed on a display screen of the display device 3.

1-3. Display Device

The display device 3 includes a display unit 31 and a display control unit 32. The display unit 31 is constituted by a liquid crystal panel, for example, and displays information supplied from the processing device 4. The display control unit 32 includes, for example, a central processing unit (CPU), and controls display of various types of information on the display unit 31. Specifically, the display device 3 is constituted by a liquid crystal display, for example. The display unit 31 also displays information input by the input unit 2 (e.g., text information input by the keyboard), a mouse pointer, and the like. Note that the information (display items) displayed on the display unit 31 will be described in detail below.

1-4. Processing Device

The processing device 4 performs various processes, such as counting of the number of fish in fluid, based on the video acquired by the imaging unit 1. The processing device 4 is constituted by a computer or a server (including a cloud server). The processing device 4 includes an analysis processing unit 41, a storage unit 42, an information output unit 43, and a processing control unit 44.

The analysis processing unit 41 is constituted by an arithmetic device or a processor specialized for real-time image processing which is referred to as a graphics processing unit (GPU), for example. The analysis processing unit 41 has a neural network that performs machine learning in advance by deep learning or the like. As a result, the analysis processing unit 41 can receive the data of the video acquired by the imaging unit 1 as an input, recognize (analyze) a specific type of fish F through an image recognition process, count the number of recognized fish F, and output a result of the counting.

Figure 2:
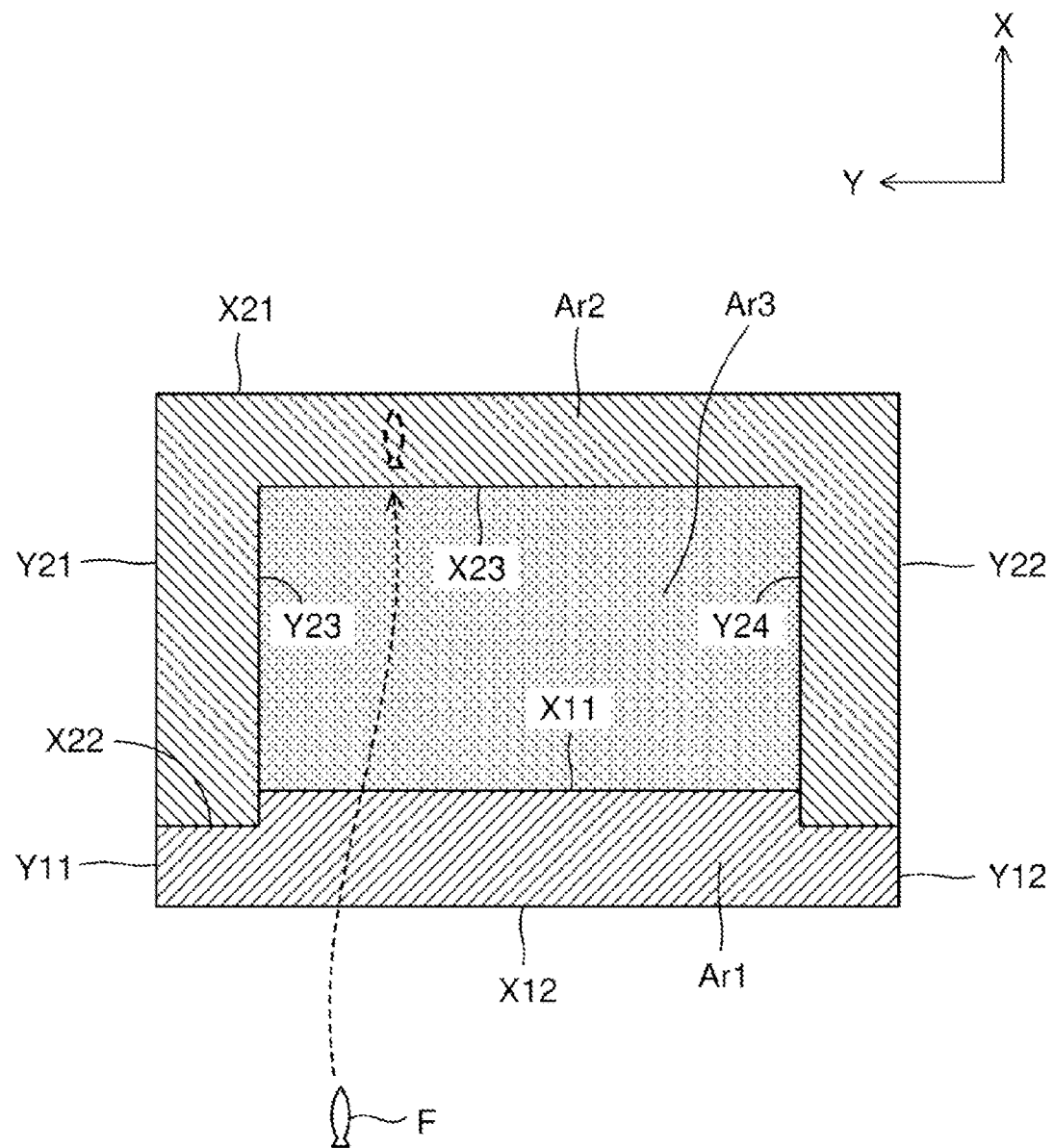
FIG. 2 is a diagram schematically illustrating an imaging region of an imaging unit of the fish counting system.

FIG. 2 is a diagram schematically illustrating an imaging region of the imaging unit 1 described above. Here, a portion of a rectangular frame of the video acquired by the imaging unit 1 is designated as a first region Ar1, and the other portion of the frame is designated as a second region Ar2. It is assumed that the first region Ar1 is a side closer to the first fish tank. In this example, when a fish F included in the first region Ar1 has moved to the second region Ar2, the analysis processing unit 41 counts the fish F.

Specifically, the analysis processing unit 41 extracts a fish F by image recognition processing performed on individual images (e.g., images in individual frames) included in time series in the video. The analysis processing unit 41 then assigns an individual identification label to the extracted fish F to identify the individual based on positions of the fish F in the past images. Thereafter, when a fish F with the same label as the label assigned to the fish F in the first region Ar1 reaches the second region Ar2, the analysis processing unit 41 counts the fish F in the image at that time. This process is merely an example, and various algorithms may be employed as long as the number of fish F can be counted.

Note that the imaging region in FIG. 2 has a third region Ar3 between the first region Ar1 and the second region Ar2. The third region Ar3 is a rectangular region and is surrounded by the first and second regions AR1 and Ar2. Since the third region Ar3 is positioned in this way, the fish F leaving the first region Ar1 does not immediately reach the second region Ar2, but is captured at positions in the third region Ar3 in a plurality of images. Therefore, the analysis processing unit 41 can recognize the fish F also in the third region Ar3. Then, since the same fish F can be recognized in the first region Ar1, the third region Ar3, and the second region Ar2, the fish F arriving from the first region Ar1 to the second region Ar2 can be tracked with high accuracy, and accordingly, the accuracy of counting of the number of fish can be improved. Note that the third region Ar3 may be omitted.

The storage unit 42 shown in FIG. 1 is a memory storing operation programs of the processing device 4 and various types of data and includes, for example, a random access memory (RAM), a read only memory (ROM), a hard disk drive, or a solid state drive (SSD). For example, the storage unit 42 stores data of a video acquired in the imaging unit 1, information, such as a result of analysis performed by the analysis processing unit 41, and other information.

The information output unit 43 outputs information, such as an analysis result (a counting result) obtained by the analysis processing unit 41, to an outside based on a control signal output from the display control unit 32 of the display device 3, and also outputs a signal for instructing a change of an imaging condition to the imaging unit 1. The information output unit 43 includes a communication interface for wired or wireless communication with an external terminal or the imaging unit 1, and a writing device for writing information to a portable recording medium (such as a nonvolatile memory).

The processing control unit 44 includes a CPU, for example, and controls operations of the individual components in the processing device 4. For example, when the input unit 2 instructs execution of recording of the video acquired by the imaging unit 1, the processing control unit 44 performs a process of recording the video (to be stored in the storage unit 42). The processing control unit 44 also functions as a correction unit that corrects, when an instruction for correcting the number of fish is input by the input unit 2, a result of counting of the number of fish by analysis performed by the analysis processing unit 41 based on the correction instruction. In addition, the processing control unit 44 has a function of a timer (a timekeeping unit) that measures time.

The processing control unit 44 also functions as a disturbance detection unit that detects a disturbance based on a video acquired by the imaging unit 1. Note that the term "disturbance" refers to an external factor that affects analysis of fish and counting of the number of fish performed by the analysis processing unit 41. Examples of the disturbance include "reflection of direct sunlight". When direct sunlight is reflected on a video, the entire video becomes brighter, and as a result, it is difficult for the analysis processing unit 41 to accurately recognize the fish F and accurately count the number of fish. In such a case, the processing control unit 44 outputs a control signal to the display device 3 to prompt a change in an imaging direction of the imaging unit 1. The display device 3 can prompt the user to change the imaging direction by displaying a message instructing the user to change the imaging direction of the imaging unit 1 based on the control signal.

The processing control unit 44 can detect the "reflection of direct sunlight" as a disturbance, for example, as follows. The processing control unit 44 divides an image of one frame included in a video acquired by the imaging unit 1 into n×n blocks (e.g., n=13). When there is a block in which an average of brightness is equal to or larger than a certain value, an average of hue is equal to or smaller than a certain value, and averages of R (red), G (green), and B (blue) are individually equal to or larger than a threshold value, the processing control unit 44 determines that there is a reflection of direct sunlight (detects a disturbance).

2. Display Screen of Display Device

Next, a display screen of the display device 3 will be described. Note that, in a description below, various buttons are displayed on the display screen of the display unit 31, and the buttons refer to regions selectable by the input unit 2 on the display screen. For example, when the input unit 2 is constituted by a mouse, the buttons refer to regions selectable by a mouse clicking on the display screen. For example, when the input unit 2 is constituted by a touch panel, the buttons refer to regions selectable by a press of the touch panel on the display screen.

Furthermore, it is assumed that display regions for various items (instruction items) displayed on the display screen of the display unit 31 are also selectable by the input unit 2, similar to the buttons described above. In other words, the display regions for the items may be considered a type of button. Therefore, the user can select one of the items displayed in the display regions by selecting one of the display regions with the input unit 2.

Figure 3:
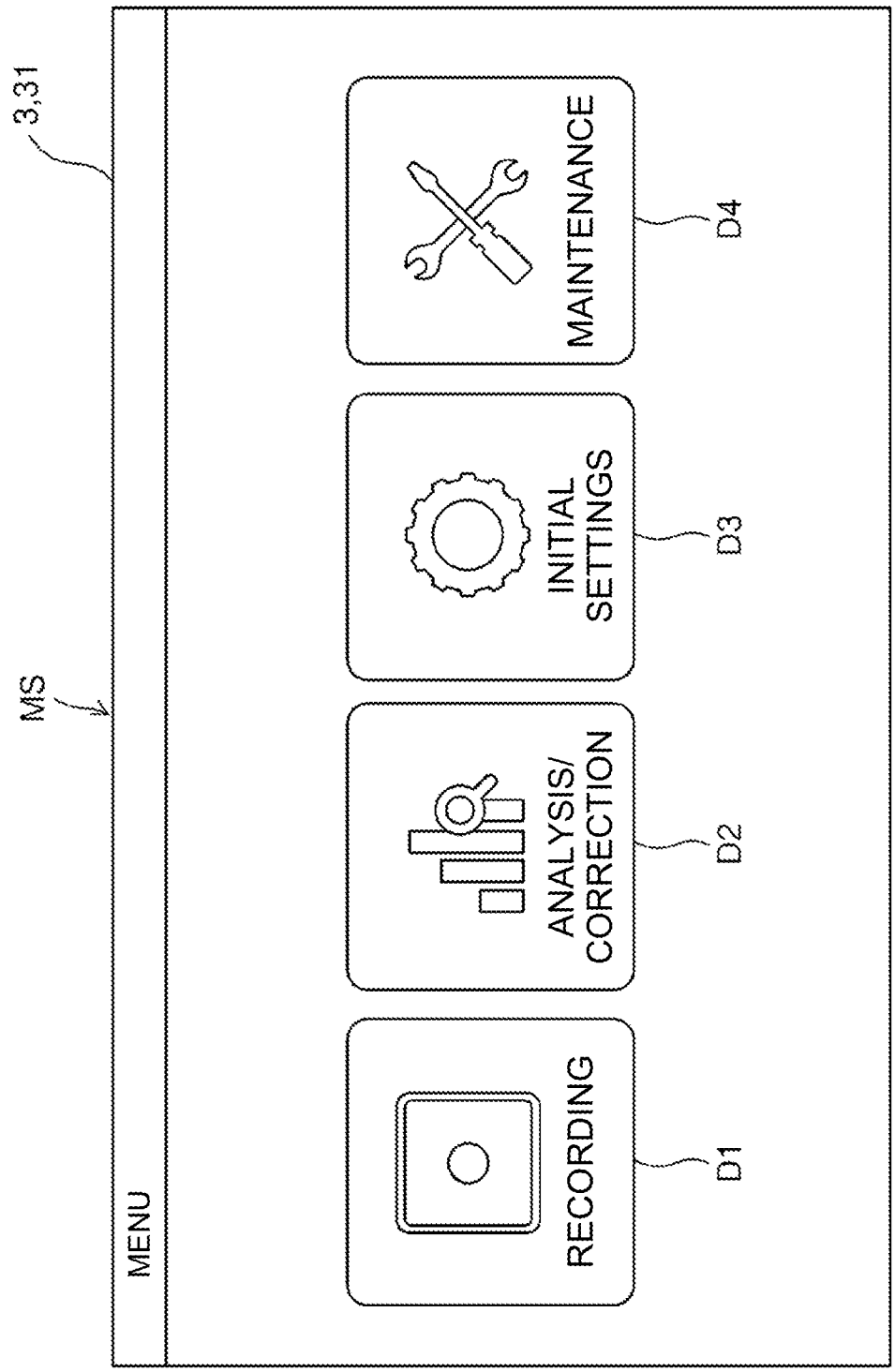
FIG. 3 is a diagram schematically illustrating a main screen displayed by a display unit of a display device of the fish counting system.

FIG. 3 is a diagram schematically illustrating a main screen MS displayed by the display unit 31 of the display device 3. Here, the main screen MS is displayed first by the display unit 31 when the user logs in the system by operating the input unit 2 (refer to FIG. 1). The display unit 31 displays a plurality of instruction items on the main screen MS. The plurality of instruction items include a recording instruction item D1, an analysis instruction item D2, an initial setting screen change instruction item D3, and a maintenance screen change instruction item D4. When one of the plurality of instruction items is selected by the input unit 2, the display control unit 32 changes a display screen of the display unit 31 in accordance with the selected instruction item. Note that a display screen after the change will be described in detail below. In other words, the display device 5 in this embodiment has the display control unit 32 that changes the display screen of the display unit 31 in accordance with a selected instruction item.

The recording instruction item D1 is used to instruct the processing device 4 to execute or stop recording of a video obtained when the imaging unit 1 captures the flow path of the fish F. Note that a recording instruction issued when the recording instruction item D1 is selected refers to an instruction for immediately recording a video acquired by the imaging unit 1. The analysis instruction item D2 is used to instruct the processing device 4 to count the number of fish by analyzing fish and correct the number of fish based on recorded past videos. The initial setting screen change instruction item D3 is used to instruct a change from the main screen MS to an initial setting screen IS (refer to FIG. 10) for setting a type of fish F to be analyzed. The maintenance screen change instruction item D4 is used to instruct a change from the main screen MS to a maintenance screen TS (refer to FIG. 11).

Thus, the display device 3 in this embodiment is used in the fish counting system 10 that counts the number of fish, and has the display unit 31 that displays the plurality of selectable instruction items (selectable by the input unit) in the main screen MS. The plurality of instruction items include the recording instruction item D1 for instructing the processing device 4 of the fish counting system 10 to execute or stop recording of a video of fish (in the flow path), and the analysis instruction item D2 for instructing the processing device 4 to count the number of fish by analyzing fish based on the recorded video.

The plurality of instruction items including the recording instruction item D1 and the analysis instruction item D2 are displayed on the main screen MS of the display unit 31. Accordingly, the user who views the display screen of the display unit 31 can intuitively recognize that at least an instruction corresponding to a selection of the recording instruction item D1 (an instruction for executing or stopping recording of a video) and an instruction corresponding to a selection of the analysis instruction item D2 (an instruction for counting the number of fish based on the fish analysis) can be issued to the processing device 4 of the fish counting system 10.

Furthermore, the fish counting system 10 according to this embodiment includes the display device 5, the input unit 2 for selecting one of the items displayed on the display unit 31 of the display device 5, and the processing device 4 that counts the number of fish in accordance with the selection of one of the items performed by the input unit 2. In this case, the effect described above can be achieved in the fish counting system 10 including the display device 5, the input unit 2, and the processing device 4. Specifically, the user viewing the display screen can intuitively recognize that the instruction for executing or stopping recording of a video and the instruction for counting based on the fish analysis may be issued in the fish counting system 10.

Next, a change of the display screen when each of the instruction items is selected on the main screen MS will be described.

2-1. Change of Display Screen at Selection of Recording Instruction Item

Figure 4:
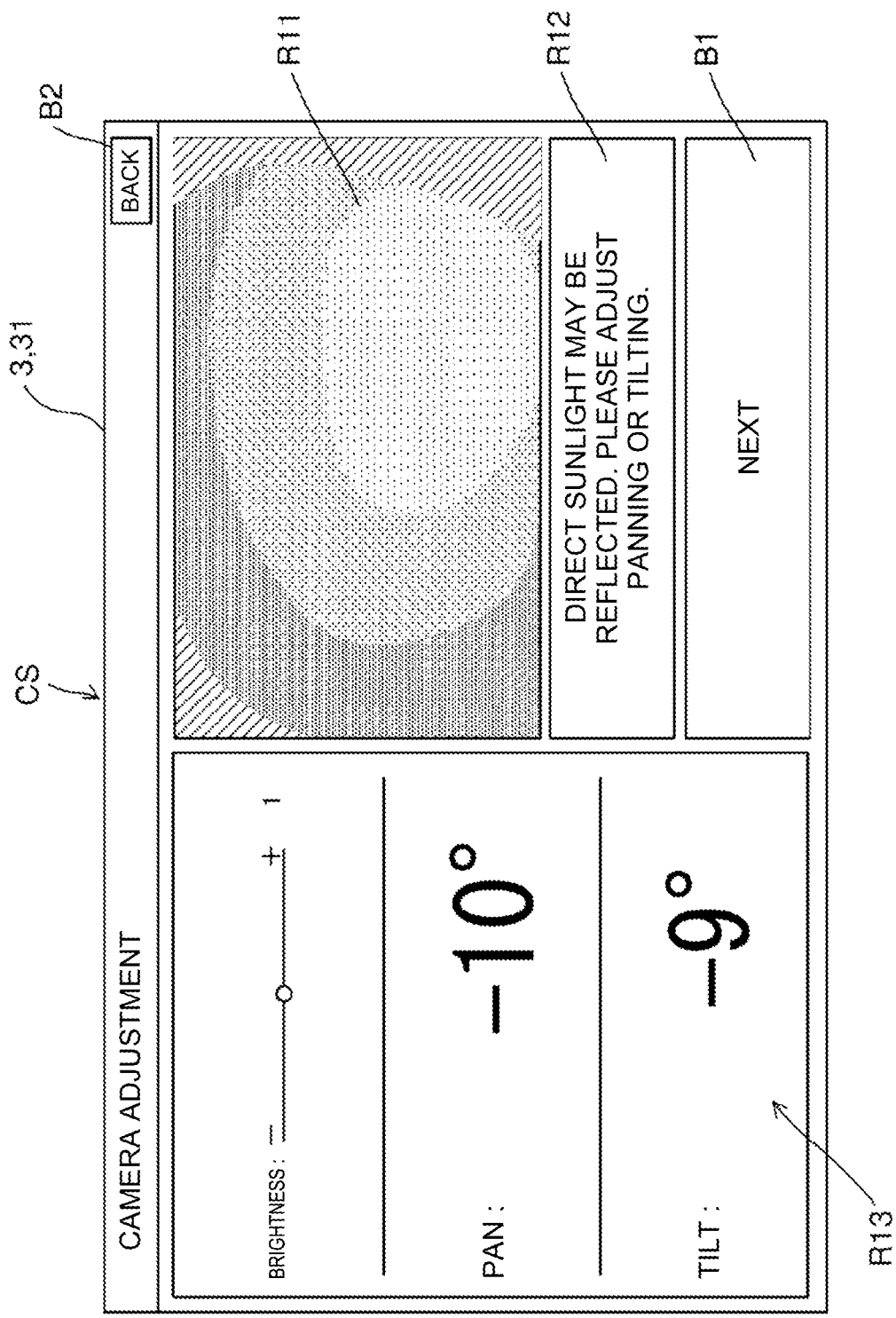
FIG. 4 is a diagram schematically illustrating an example of a camera adjustment screen displayed by the display unit.
Figure 5:
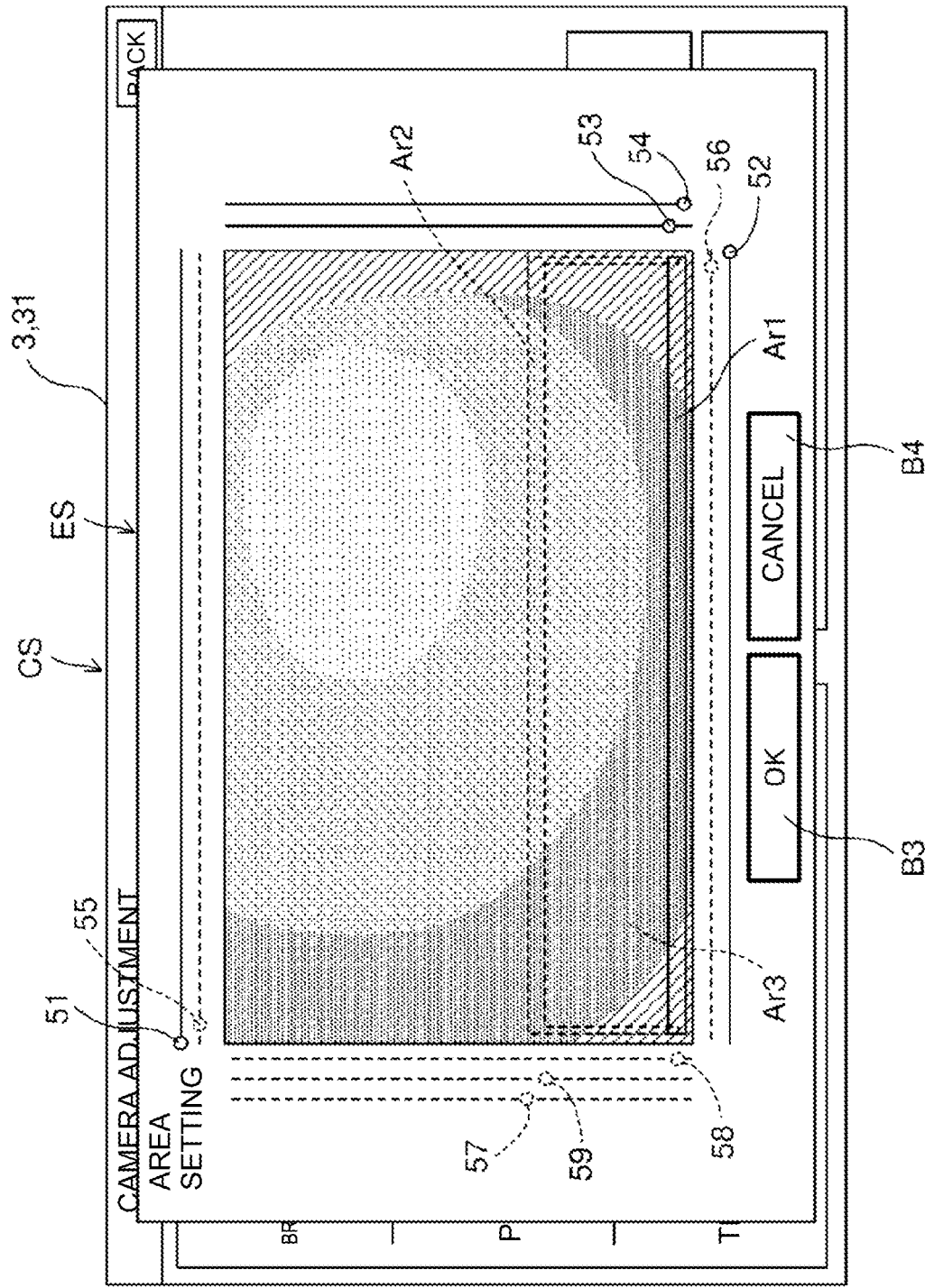
FIG. 5 is a diagram schematically illustrating an example of an area setting screen displayed by the display unit.

When the recording instruction item D1 is selected by the input unit 2 on the main screen MS of the display unit 31, the display control unit 32 changes the display screen of the display unit 31 from the main screen MS to an operation screen RS (refer to FIG. 6) through a camera adjustment screen CS (refer to FIG. 4) and an area setting screen ES (refer to FIG. 5). The user can instruct recording of a video on the operation screen RS.

2-1-1. Camera Adjustment Screen

FIG. 4 is a diagram schematically illustrating an example of the camera adjustment screen CS. The camera adjustment screen CS has a video display region R11, a message display region R12, and a setting region R13. In the video display region R11, a video acquired by the imaging unit 1 (refer to FIG. 1) is supplied to the display device 3 via the processing device 4 (refer to FIG. 1) and displayed. Note that the video is supplied from the processing device 4 to the display device 3 almost in real time, although there is some delay from an acquisition by the imaging unit 1.

When the processing control unit 44 of the processing device 4 detects a disturbance based on the video, a message is displayed in the message display region R12 to instruct the user to change the imaging direction (pan or tilt) of the imaging unit 1. In FIG. 4, an example in which a message prompting a user to adjust pan and tilt of the imaging unit 1 is displayed in the message display region R12 since the processing control unit 44 has detected "reflection of direct sunlight" as a disturbance is illustrated.

The setting region R13 is used to set imaging conditions of the imaging unit 1 including brightness of the video and the imaging direction of the imaging unit 1. The user who views the video displayed in the video display region R11 and the message displayed in the message display region R12 can set and change the imaging conditions by operating the input unit 2 on the setting region R13 (by sliding a pointer or inputting numerical values using a numeric keypad on a keyboard, etc.) The information set in the setting region R13 is output to the imaging unit 1 via the processing device 4, and the imaging unit 1 automatically adjusts the imaging conditions.

In the camera adjustment screen CS, when the user selects a button "Next" B1 at a lower right corner of the screen using the input unit 2, the display screen changes to the area setting screen ES (refer to FIG. 5), and when the user selects a button "Back" B2 at an upper right corner of the screen, the display screen returns to the main screen MS (refer to FIG. 3). Note that, when a default setting is that adjustment of the imaging unit 1 is not required, the change from the main screen MS to the camera adjustment screen CS may be omitted (skipped).

2-1-2. Area Setting Screen

FIG. 5 is a diagram schematically illustrating an example of the area setting screen ES. Note that, although the area setting screen ES is popped up on the camera adjustment screen CS in FIG. 5, the camera adjustment screen CS may be removed from the display screen of the display unit 31 so that only the area setting screen ES is displayed.

The area setting screen ES is used to set sizes of areas to be used for fish counting performed on a video acquired by the imaging unit 1, specifically, the first region Ar1, the second region Ar2, and the third region Ar3 shown in FIG. 2. Of two directions perpendicular to a depth direction of the first and second fish tanks, a direction from the first fish tank to the second fish tank is determined as an X direction, and a direction perpendicular to the X direction is determined as a Y direction. Furthermore, it is assumed that the X direction corresponds to a direction from a bottom to a top of the area setting screen ES, and the Y direction corresponds to a direction from right to left of the area setting screen ES.

Furthermore, assuming that an imaging region has an entirely rectangular shape configured such that the second region Ar2 surrounds three sides of the rectangular third region Ar3 and the first region Ar1 is positioned adjacent to the other side of the third region Ar3 as shown in FIG. 2, a boundary between the first region Ar1 and the third region Ar3 that are aligned in the X direction is denoted by X11 and an edge of the first region Ar1 that is far from the third region Ar3 is denoted by X12. Furthermore, an edge of the first region Ar1 in a +Y direction and an edge of the first region Ar1 in a −Y direction are denoted by Y11 and Y12, respectively. Furthermore, an edge of the second region Ar2 in the +Y direction and an edge of the second region Ar2 in the −Y direction are denoted by Y21 and Y22, respectively. Of boundaries between the second and third regions Ar2 and Ar3 aligned in the Y direction, the boundary located in the +Y direction is demoted by Y23 and the boundary located in the −Y direction is denoted by Y24. The edge Y21, the boundary Y23, the boundary Y24 and the edge Y22 are located in this order from a +Y direction side to a −Y direction side. Furthermore, an edge of the second region Ar2 in a +X direction and an edge of the second region Ar2 in a −X direction are denoted by X21 and X22, respectively. A boundary between the second region Ar2 and the third region Ar3 in the X direction is denoted by X23. Note that, in the X direction, the boundary X23 is positioned between the edges X21 and X22.

In the area setting screen ES of FIG. 5, positions of the edge Y11 of the first region Ar1 (refer to FIG. 2) and the edge Y21 of the second region Ar2 (refer to FIG. 2) in the Y direction can be set or changed by sliding a slide unit 51 in an upper portion in the screen in a lateral direction using the input unit 2. Positions of the edge Y12 of the first region Ar1 (refer to FIG. 2) and the edge Y22 of the second region Ar2 (refer to FIG. 2) in the Y direction can be set or changed by sliding a slide unit 52 in a lower portion in the screen in the lateral direction using the input unit 2. A position of the boundary X11 (refer to FIG. 2) in the X direction can be set or changed by sliding a slide unit 53 in a right portion in the screen in a vertical direction using the input unit 2. A position of the edge X12 (refer to FIG. 2) of the first region Ar1 in the X direction can be set or changed by sliding a slide unit 54 in the right portion in the screen in the vertical direction using the input unit 2.

Furthermore, in the area setting screen ES of FIG. 5, a position of the boundary Y23 of the second region Ar2 (refer to FIG. 2) in the Y direction can be set or changed by sliding a slide unit 55 in the upper portion in the screen in the lateral direction using the input unit 2. A position of the boundary Y24 of the second region Ar2 (refer to FIG. 2) in the Y direction can be set or changed by sliding a slide unit 56 in the lower portion in the screen in the lateral direction using the input unit 2. A position of the edge X21 (refer to FIG. 2) of the second region Ar2 in the X direction can be set or changed by sliding a slide unit 57 in the left portion in the screen in the vertical direction using the input unit 2. A position of the edge X22 (refer to FIG. 2) of the second region Ar2 in the X direction can be set or changed by sliding a slide unit 58 in the left portion in the screen in the vertical direction using the input unit 2. A position of the boundary X23 (refer to FIG. 2) in the X direction can be set or changed by sliding a slide unit 59 in the left portion in the screen in the vertical direction using the input unit 2.

In the area setting screen ES, when the user selects a button "OK" B3 in a lower left portion in the screen using the input unit 2, the display screen changes to the operation screen RS (refer to FIG. 6), and when the user selects a button "Cancel" B4 in a lower right portion in the screen, the display screen returns to the camera adjustment screen CS (refer to FIG. 4). Note that the change from the main screen MS to the area setting screen ES may be omitted (skipped) as a default setting.

2-1-3. Operation Screen

FIG. 6 is a diagram schematically illustrating an example of the operation screen RS. In the operation screen RS, a recording instruction button B5 is displayed. The recording instruction button B5 is used to instruct the processing device 4 to execute or stop recording of a video acquired by the imaging unit 1 (refer to FIG. 1) and is selected by the input unit 2. The recording instruction button B5 is displayed as an icon including a word "Run" before recording is executed, and as an icon including a word "Stop" after the recording is executed.

On the operation screen RS, when the recording instruction button B5 is selected by the input unit 2 so that an instruction for executing recording is issued, the display control unit 32 outputs a control signal instructing recording of a video to the processing device 4, and the video recording is executed by the processing device 4 in accordance with the control signal (the video is stored in the storage unit 42). On the other hand, on the operation screen RS, when the recording instruction button B5 is selected by the input unit 2 so that an instruction for stopping the recording is issued, the display control unit 32 outputs a control signal instructing stop of the recording of the video to the processing device 4, and the video recording is stopped by the processing device 4 in accordance with the control signal.

Thus, when the recording instruction item D1 is selected (by the input unit 2) on the main screen MS illustrated in FIG. 3 (refer to FIG. 3), the display control unit 32 changes the display screen of the display unit 31 to the operation screen RS that includes the recording instruction button B5 for instructing execution or stop of recording. Accordingly, the user can input an instruction for executing or stopping recording to the processing device 4 by selecting (e.g., clicking or pressing) the recording instruction button B5 displayed on the operation screen MS with the input unit 2.

In FIG. 6, a state in which recording on a video is already being performed by the processing device 4 after the execution of the recording is instructed by the input unit 2 is illustrated. When the video recording is executed by the processing device 4, an elapsed time after execution of the recording is started is measured by a timekeeping function of the processing control unit 44 and time information of the elapsed time is output to the display device 3. The elapsed time is then displayed on the operation screen RS of the display unit 31. In FIG. 6, 10 minutes has elapsed since the execution of the video recording is started, for example. In this way, on the operation screen RS, the display unit 31 displays an elapsed time after execution of recording is started when the execution of the recording is instructed. Accordingly, the user can easily recognize a recording time of a video by viewing the operation screen RS.

Furthermore, in the operation screen RS, the video acquired by the imaging unit 1 and input to the display device 3 via the processing device 4 is displayed in the display region R14. In other words, the display unit 31 displays the video acquired by the imaging unit 1 on the operation screen RS. In this case, the user can instruct execution or stop of recording at an appropriate timing by selecting the recording instruction button B5 using the input unit 2 while viewing the video displayed on the operation screen RS.

Here, when the processing device 4 is capable of performing recording of the video acquired by the imaging unit 1 and counting of the number of fish based on the video in parallel (by real-time processing), the processing device 4 outputs information on a result of the counting of the number of fish to the display device 3. In this case, the recording display screen RS on the display unit 31 displays the result of the counting of the number of fish. In the example in FIG. 6, the result of counting of the number of fish is displayed at a lower right corner in the operation screen RS.

Thus, the display unit 31 further displays the number of counted fish on the operation screen RS when the number of fish is counted by the processing device 4 based on the video along with the recording of the video. In this case, the user can immediately recognize the number of counted fish (by the real-time processing) along with the recording by viewing the operation screen RS.

Note that, in the camera adjustment screen CS described above (refer to FIG. 4), when the video becomes dark due to a change in the imaging conditions, or when the counting of fish is disturbed, a warning signal may be output from the processing device 4 to the display device 3. Then, in the display device 3, the display unit 31 may display an indication in the region R15 of the operation screen RS for prompting the user to reconfigure the imaging conditions on the camera adjustment screen CS based on the warning signal. The user who views content displayed in the region R15 can return to the camera adjustment screen CS to reconfigure the imaging conditions by selecting a button "Back" B6 displayed on the operation screen RS with the input unit 2.

Furthermore, when the recording instruction item D1 is selected on the main screen MS, the display control unit 32 changes the display screen of the display unit 31 from the main screen MS to the operation screen RS via the camera adjustment screen CS (refer to FIG. 4) described above. As shown in FIG. 4, the display unit 31 then displays the video acquired by the imaging unit 1 (in the video display region R11) on the camera adjustment screen CS, and in addition, displays the setting region R13 for settings associated with brightness of the video and the imaging direction of the imaging unit 1.

Before instructing the processing device 4 to perform recording on the operation screen RS, the user can set the brightness and the imaging direction (pan and tilt) of the video in the setting region R13 while viewing the displayed video on the camera adjustment screen CS, so that the processing device 4 can perform recording of the video with the appropriate brightness and in the appropriate imaging direction.

In particular, according to this embodiment, the display control unit 32 changes the main screen MS to the operation screen RS via the camera adjustment screen CS and the area setting screen ES (refer to FIG. 5). Then, as shown in FIG. 5, the display unit 31 displays areas of targets of the counting of the number of fish in an adjustable manner in the video acquired by the imaging unit 1 on the area setting screen ES.

The user can properly adjust the regions of the targets of the counting of the number of fish (the first region Ar1, the second region Ar2, and the third region Ar3) on the area adjustment screen ES, and therefore, when the user instructs the processing device 4 to count the number of fish by analyzing the fish, the number of fish passing through the set areas can be properly counted.

2-2. Change of Display Screen at Selection of Analysis Instruction Item

When the analysis instruction item D2 is selected by the input unit 2 on the main screen MS of the display unit 31 illustrated in FIG. 3, the display control unit 32 changes the display screen of the display unit 31 from the main screen MS to a file management screen FS (refer to FIG. 7). The user can instruct counting of the number of fish based by analyzing the fish on the file management screen FS.

2-2-1. File Management Screen

FIG. 7 is a diagram schematically illustrating an example of the file management screen FS displayed by the display unit 31. In a left portion in the file management screen FS, information on date and times of imaging performed by the imaging unit 1 are displayed for individual videos (individual recorded files) that have been recorded (stored in the storage unit 42). Furthermore, text "Analyzed" is displayed for recorded files which have been subjected to the fish counting performed based on the fish analysis, and text "Unanalyzed" is displayed for recorded files which have not been subjected to the fish counting. In a right portion in the file management screen FS, information on a date and time of imaging, last update, fish species (set in the initial setting screen IS described below with reference to FIG. 10), a result of counting of the number of fish, and the like for one of the recorded files that is selected by the input unit 2 (and that is surrounded by a thick frame in FIG. 7) are displayed. The various types of information displayed on the file management screen FS is supplied from the processing device 4. Note that, in the file management screen FS, an icon indicating "analyzed" or "unanalyzed" may be displayed instead of the text "analyzed" or "unanalyzed".

Furthermore, the file management screen FS also displays an analysis instruction button B7, a display instruction button B8, a delete button B9, and an export instruction button B10.

The delete button B9 is used to instruct deletion of an unrequired file, among the recorded files displayed on the file management screen FS, and information associated therewith (e.g., an imaging date and time). When an unrequired recorded file is selected by the input unit 2 and the delete button B9 is clicked or pressed, a control signal is output to the processing device 4 to instruct the deletion of the selected recorded file. By this, in the processing device 4, the selected recorded file and the information associated therewith are deleted from the storage unit 42 based on the control signal.

The export instruction button B10 is an output instruction button for instructing an external output of information, such as a recorded file and a result of analysis of the file (a counting result). When a desired recorded file is selected by the input unit 2 and the export instruction button B10 is clicked or pressed, a control signal is output to the processing device 4 to instruct an output of the selected recorded file. By this, in the processing device 4, the selected recorded file and information associated therewith are output to an outside based on the control signal. Note that the output of the recorded file and the like to the outside is achieved by communication or by writing to a recording medium.

The analysis instruction button B7 is used to instruct counting of the number of fish performed by analyzing the fish based on the recorded video. On the file management screen FS, when a desired recorded file is selected using the input unit 2 and the file analysis instruction button B7 is selected (e.g., clicked) by further operating the input unit 2, the display control unit 32 outputs a control signal instructing the fish analysis to the processing device 4. Then, based on the control signal, the analysis processing unit 41 of the processing device 4 executes the fish analysis and the counting of the number of fish based on the fish analysis.

Figure 8:
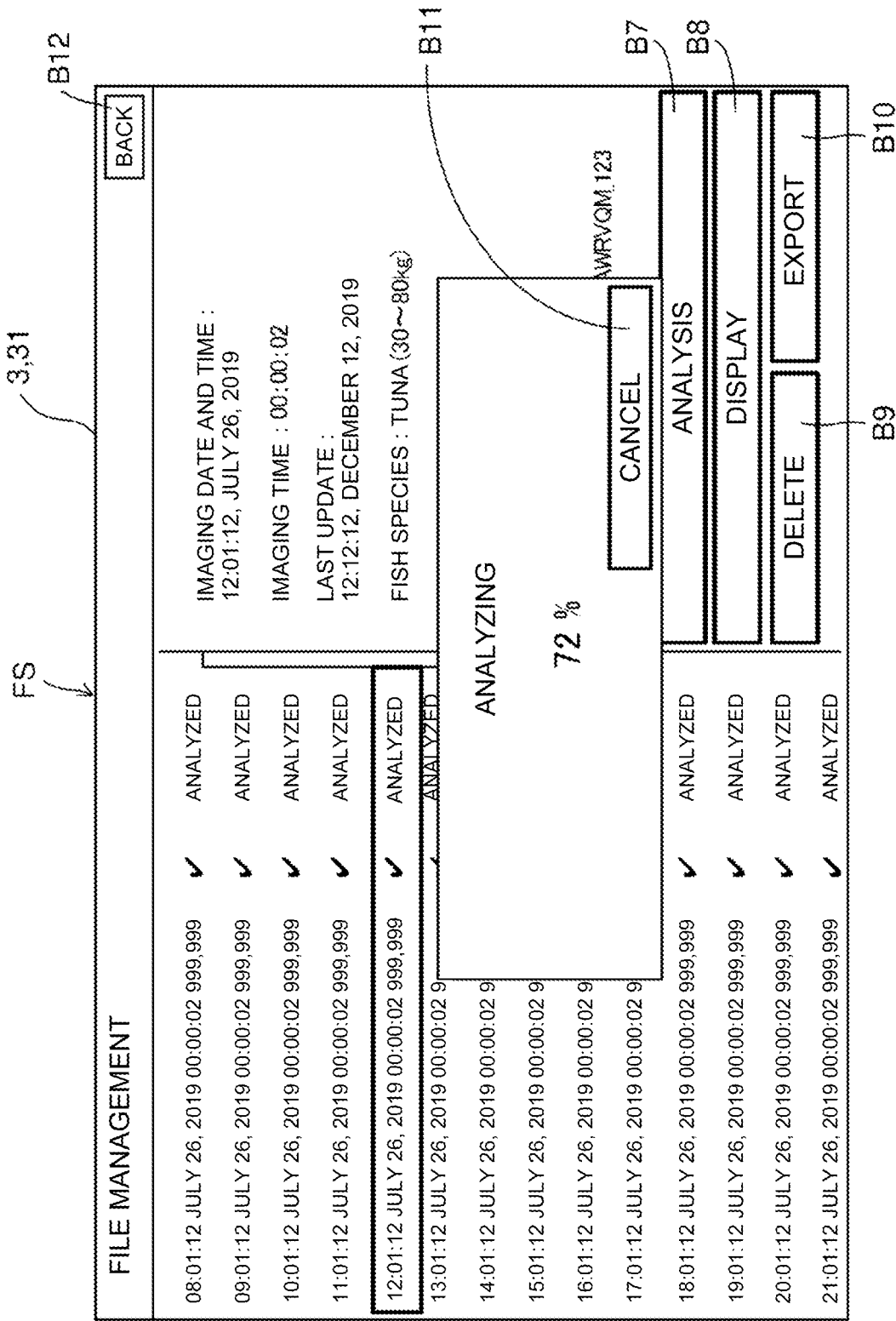
FIG. 8 is a diagram schematically illustrating a screen showing a progress of analysis.

During the fish analysis in the processing device 4, a screen showing a progress of the analysis pops up on the file management screen FS as shown in FIG. 8. When the analysis is to be stopped in the middle, stop of the analysis may be instructed to the processing device 4 using the display device 5 by selecting a button "Cancel" B11 using the input unit 2.

The display instruction button B8 is used to instruct a change to a result display screen AS which displays a result of the fish counting performed by the processing device 4 (the analysis processing unit 41). On the file management screen FS, when the display instruction button B8 is selected by the input unit 2, the display control unit 32 outputs a control signal to the processing device 4 to instruct an output of the result of the fish counting, and information on the result of the fish counting performed by the analysis processing unit 41 is output to the display device 3 based on the control signal. Therefore, the display screen of the display unit 31 of the display device 3 displays the result of the fish counting performed by the processing device 4. Specifically, the display screen of the display unit 31 of the display device 3 changes from the file management screen FS to the result display screen AS (refer to FIG. 9).

2-2-2. Result Display Screen

Figure 9:
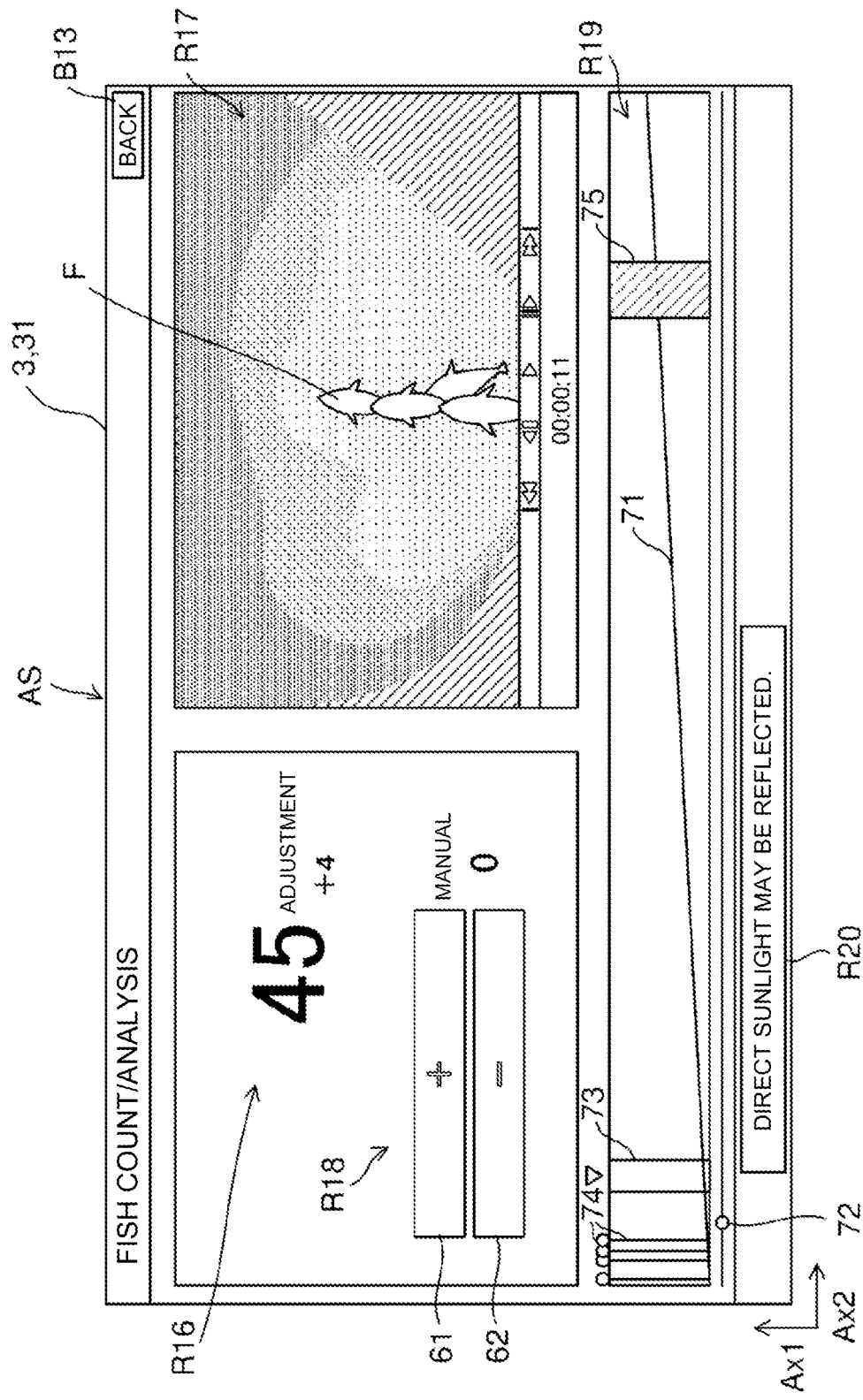
FIG. 9 is a diagram schematically illustrating an example of a result display screen displayed by the display unit.

FIG. 9 is a diagram schematically illustrating an example of the result display screen AS displayed by the display unit 31. The result display screen AS includes a counting result indication region R16, a video display region R17, a correction region R18, a fish count change indication region R19, and a disturbance information display region R20.

In the counting result indication region R16, the number of fish counted by the analysis processing unit 41 of the processing device 4 is displayed. In the example in FIG. 9, a counting result of 45 for the entire recorded video (a moving image) is indicated. In the video display region R17, the video of the recorded file that is a target of the fish counting is displayed. Accordingly, the user can input a correction value of the number of fish in the correction region R18 while viewing the video displayed in the video display region R17. Furthermore, in the video display region R17, instruction icons for reproduction of a moving image (a plurality of images), pause, screen feeding in a unit of frame, screen reversing in a unit of frame, frame display with time specified, and a change in a reproduction portion with time specified are also displayed.

The correction region R18 is used by the user to input a correction value of the number of fish using the input unit 2. In the correction region R18, an addition button 61 and a subtraction button 62 are displayed. When the user clicks (or presses) the addition button 61 once at a time by the input unit 2, the correction value for the number of fish is incremented by one. On the other hand, when the user clicks (or presses) the subtraction button 62 once at a time by the input unit 2, the correction value for the number of fish is decremented by one. In the example in FIG. 9, a correction value for an image in a current frame is 0 and a correction value for the entire recorded video is +4. The information on the number of fish corrected in the correction region R18 is output from the display device 3 to the processing device 4 and stored in the storage unit 42 of the processing device 4 after being associated with the recorded file.

In the fish count change indication region R19, a graph 71 showing transition of the number of counted fish over time and a slider bar 72 are displayed. An axis of ordinates Ax1 of the graph 71 corresponds to the number of fish counted per unit time, and an axis of abscissae Ax2 corresponds to elapsed time. When a period of time in which imaging of a video is performed is long, and therefore, the graph 71 is not accommodated in a single screen, the slider bar 72 is displayed in the fish count change indication region R19. By sliding the slider bar 72, a result of counting at any time point can be displayed.

Furthermore, in the fish count change indication region R19, a current time point 73 indicating a time point of an image (a frame) currently displayed, a correction time point 74 indicating a time point when a correction value is input, and a marking 75 indicating a time point when the processing control unit 44 of processing device 4 detects a disturbance are displayed. A disturbance information display region R20 displays information on a detection of a disturbance.

In the result display screen AS, when the user selects a button "Back" B13 at an upper right corner of the screen by the input unit 2, the display screen changes to the file management screen FS (refer to FIG. 7). Furthermore, in the file management screen FS, when the user selects a button "Back" B12 at an upper right corner of the screen by the input unit 2, the display screen changes to the main screen MS (refer to FIG. 3).

As described above, when the analysis instruction item D2 is selected (by the input unit 2) on the main screen MS illustrated in FIG. 3, the display control unit 32 changes the display screen of the display unit 31 to the file management screen FS (refer to FIG. 7) that includes the analysis instruction button B7 for instructing counting of the number of fish to be performed by analyzing the fish based on the recorded video.

The user can input an instruction for counting the number of fish to the processing device 4 by selecting (e.g., clicking or pressing) the analysis instruction button B7 displayed on the file management screen FS with the input unit 2 when selecting the analysis instruction item D2 on the main screen MS.

Furthermore, the display unit 31 further displays the display instruction button B8 for instructing a change to the result display screen AS which displays a result of the fish counting on the file management screen FS.

By selecting (e.g., clicking or pressing) the display instruction button B8 on the file management screen FS of the display unit 31 with the input unit 2, the user can change the display screen of the display unit 31 from the file management screen FS to the result display screen AS. Accordingly, the user can recognize the result of the fish counting on the result display screen AS.

Furthermore, the display unit 31 further displays the export instruction button B10 serving as the output instruction button for instructing an output of a result of the fish counting to an outside on the file management screen FS.

By selecting the export instruction button B10 on the file management screen FS on the display unit 31 using the input unit 2, the user can export information on a result of the fish counting to be externally checked.

2-3. Change of Display Screen at Selection of Initial Setting Screen Change Instruction Item When the initial setting screen change instruction item D3 is selected by the input unit 2 on the main screen MS of the display unit 31 illustrated in FIG. 3, the display control unit 32 changes the display screen of the display unit 31 from the main screen MS to the initial setting screen IS (refer to FIG. 10).

FIG. 10 is a diagram schematically illustrating an example of the initial setting screen IS. The initial setting screen IS has a fish species input region R21. In the fish species input region R21, species of the fish F (tuna, mackerel, etc.) are registered as a list in advance. In the fish species input region R21, the user can set a fish species that is a target of the analysis of the fish F by selecting the desired fish species in the list of registered fish species with the input unit 2.

When the user selects a button "Back" B14 at an upper right corner of the initial setting screen IS by the input unit 2, the display screen changes to the main screen MS (refer to FIG. 3).

As described above, the plurality of instruction items displayed on the main screen MS of the display unit 31 further include the initial setting screen change instruction item D3 for instructing a change to the initial setting screen IS for setting a species of the fish F to be analyzed.

The user can set a fish species on the initial setting screen IS after selecting the initial setting screen change instruction item D3 on the main screen MS using the input unit 2 to display the initial setting screen IS on the display unit 31. By this, the fish analysis and the counting of the number of fish based on the fish analysis for a set fish species may be instructed to the processing device 4.

2-4. Change of Display Screen at Selection of Maintenance Screen Change Instruction Item When the maintenance screen change instruction item D4 is selected by the input unit 2 on the main screen MS of the display unit 31 illustrated in FIG. 3, the display control unit 32 changes the display screen of the display unit 31 from the main screen MS to a maintenance screen TS (refer to FIG. 11).

FIG. 11 is a diagram schematically illustrating an example of the maintenance screen TS. The maintenance screen TS has an export instruction region R22. The user can instruct the processing device 4 to output a log (history information) representing use history of the processing device 4 by selecting the export instruction region R22 using the input unit 2. The processing device 4 outputs the log to an outside (e.g., an external terminal) based on the instruction. Accordingly, a maintainer (e.g., a system developer, a manufacturer, or a service person) can perform maintenance on the display device 5 and thus the fish counting system 10 by referring to the log.

When the user selects a button "Back" B15 at an upper right corner of the maintenance screen TS by the input unit 2, the display screen changes to the main screen MS (refer to FIG. 3).

As described above, the plurality of instruction items displayed on the main screen MS of the display unit 31 further includes the maintenance screen change instruction item D4 for instructing a change to the maintenance screen TS.

The maintainer can input a required instruction (a log output instruction, for example) on the maintenance screen TS to perform maintenance by selecting the maintenance change instruction item D4 on the main screen MS and displaying the maintenance screen TS on the display unit 31.

3. Display Control Program

The display device 3 of this embodiment shown in FIG. 1 or the fish counting system 10 including the display device 3 may be configured by a computer with an operating program (application software) installed. The program may be read and executed by the computer (such as the display control unit 32 or the processing control unit 44 as a CPU) so that a step of displaying the individual items on the display unit 31 of the display device 3 is executed. Such a program may be obtained, for example, by downloading from an outside via a network or by reading the program from a computer-readable recording medium, such as a compact disk read only memory (CD-ROM) that includes the program. Specifically, the display control program according to this embodiment may be represented as follows.

The display control program causes a computer to execute, on the main screen MS of the display unit 31 of the display device 3, a step of displaying the recording instruction item D1 for instructing the processing device 4 of the fish counting system 10 to perform or stop recording of a video of fish (in a flow path) and a step of displaying the analysis instruction item D2 for instructing the processing device 4 to count the number of fish by analysis of the fish based on the recorded video.

The display control program may further cause the computer to execute a step of changing the display screen of the display unit 31 to the operation screen RS having the recording instruction button B5 for instructing execution or stop of the recording when the recording instruction item is selected on the main screen MS.

The display control program may cause the computer to execute a step of displaying an elapsed time after execution of recording is started on the display unit 31 when the execution of the recording is instructed on the operation screen RS.

The display control program may cause the computer, on the operation screen RS, to execute a step of displaying the video acquired by the imaging unit 1 on the display unit 31.

The display control program may cause the computer to execute a step of displaying the number of counted fish on the operation screen RS when the number of fish is counted based on the video, along with the recording of the video in the processing device 4.

The display control program may cause the computer to execute a step of changing the display screen of the display unit 31 from the main screen MS to the operation screen RS via the camera adjustment screen CS when the recording instruction item D1 is selected on the main screen MS and a step of displaying, on the camera adjustment screen CS, the setting region R13 for performing settings associated with brightness of the video and the imaging direction of the imaging unit 1 along with the display of the video acquired by the imaging unit 1.

The display control program may cause the computer to execute a step of changing the main screen MS to the operation screen RS via the camera adjustment screen CS and the area setting screen ES and a step of displaying, on the area setting screen ES, areas of targets of the fish counting in the video acquired by the imaging unit 1.

The display control program may cause the computer to execute a step of changing the display screen of the display unit 31 to the file management screen FS having the analysis instruction button B7 for instructing counting of the number of fish by analyzing the fish based on the recorded video when the analysis instruction item D2 is selected on the main screen MS.

The display control program may cause the computer to execute a step of displaying, on the file management screen FS, the display instruction button B8 for instructing a change to the result display screen FS which displays a result of the fish counting.

The display control program may cause the computer to execute a step of displaying, on the file management screen FS, the output instruction button (the export instruction button B10) for instructing an output of the result of the fish counting to an outside.

The display control program may cause the computer to execute a step of further displaying, on the main screen MS of the display unit 31, the initial setting screen change instruction item D3 for instructing a change to the initial setting screen IS for setting a type of fish to be analyzed.

The display control program may cause the computer to execute a step of further displaying, on the main screen MS of the display unit 31, the maintenance screen change instruction item D4 for instructing a change to the maintenance screen MS.

Furthermore, the computer-readable recording medium of this embodiment may record the display control programs described above.

Moreover, the display method according to this embodiment may include at least one of the steps described above.

The embodiment of the present invention has been described above, but the scope of the present invention is not limited thereto. The present invention can be carried out within an extended or modified range without departing from the gist of the present invention.

INDUSTRIAL APPLICABILITY

The display device according to the present invention can be used, for example, in a fish counting system.

DESCRIPTION OF REFERENCE NUMERALS 1 imaging unit
2 input unit
3 display device
4 processing device
10 fish counting system
31 display unit
32 display control unit
B5 recording instruction button
B7 analysis instruction button
B8 display instruction button
B10 export instruction button (output instruction button)
R13 setting region
D1 recording instruction item
D2 analysis instruction item
D3 initial screen change instruction item
D4 maintenance screen change instruction item
MS main screen
CS camera adjustment screen
ES area setting screen
RS operation screen
FS file management screen
AS result display screen
IS initial setting screen
TS maintenance screen

The invention claimed is:

1. A display device for use in a fish counting system that counts a number of fish, the display device comprising:
    a display unit configured to display a plurality of selectable instruction items on a main screen; and
    a display control unit configured to change a display screen of the display unit in accordance with a selected one of the plurality of selectable instruction items,
    wherein the plurality of selectable instruction items includes:
        a recording instruction item for instructing a processing device of the fish counting system to perform or stop recording of a video of fish, and
        an analysis instruction item for instructing the processing device to count the number of fish by fish analysis based on the recorded video, and
    wherein, based on selection of the recording instruction item on the main screen, the display control unit is configured to change the display screen of the display unit to an operation screen that includes a recording instruction button for instructing execution or stop of the recording.

2. The display device according to claim 1, wherein, when execution of the recording is instructed in the operation screen, the display unit is further configured to display an elapsed time after the execution of the recording is started.

3. The display device according to claim 1, wherein the display unit is further configured to display the video acquired by an imaging unit on the operation screen.

4. The display device according to claim 1, wherein the display unit is further configured to display the number of counted fish on the operation screen when the number of fish is counted by the processing device based on the video, along with the recording of the video.

5. The display device according to claim 1, wherein:
based on selection of the recording instruction item on the main screen, the display control unit is configured to change the display screen of the display unit from the main screen to the operation screen via a camera adjustment screen, and
the display unit is configured to:
    display the video acquired by an imaging unit on the camera adjustment screen, and
    display a setting region for performing settings associated with brightness of the video and an imaging direction of the imaging unit.

6. The display device according to claim 5, wherein:
the display control unit is configured to change the main screen to the operation screen via the camera adjustment screen and an area setting screen, and
the display unit is configured to display, on the area setting screen, areas of targets of counting of the number of fish in an adjustable manner in the video acquired by the imaging unit.

7. The display device according to claim 1, wherein, based on selection of the analysis instruction item on the main screen, the display control unit is configured to change the display screen of the display unit to a file management screen that includes an analysis instruction button for instructing counting of the number of fish by analyzing the fish based on the recorded video.

8. The display device according to claim 7, wherein the display unit is further configured to display, on the file management screen, a display instruction button for instructing a change to a result display screen which displays a result of the fish counting.

9. The display device claim 7, wherein the display unit is further configured to display, on the file management screen, an output instruction button for instructing an output of a result of the fish counting to an outside.

10. The display device according to claim 1, wherein the plurality of selectable instruction items further include an initial setting screen change instruction item for instructing a change to an initial setting screen for setting a species of the fish to be analyzed.

11. The display device according to claim 1, wherein the plurality of selectable instruction items further include a maintenance screen change instruction item for instructing a change to a maintenance screen.

12. A fish counting system comprising:
the display device according to claim 1;
an input unit for selecting an item to be displayed on the display unit of the display device; and
the processing device configured to count the number of fish in accordance with the selection of the item by the input unit.

13. A display control program product storing instructions that, when executed by a computer, cause the computer to:
display, on a main screen of a display unit of a display device, a recording instruction item for instructing a processing device of a fish counting system to perform or stop recording of a video of fish; and
display, on the main screen of the display unit of the display device, an analysis instruction item for instructing the processing device to count the number of fish by analyzing the fish based on the recorded video, and
change a display screen of the display unit in accordance with a selected one of a plurality of selectable instruction items that include the recording instruction item and the analysis instruction item,
wherein, based on selection of the recording instruction item on the main screen, change a display screen of the display unit to an operation screen that includes a recording instruction button for instructing execution or stop of the recording.

* * * * *